US006609681B2

United States Patent
Buder

(10) Patent No.: US 6,609,681 B2
(45) Date of Patent: Aug. 26, 2003

(54) METHOD AND APPARATUS FOR DAMPING VIBRATION

(75) Inventor: Daniel A. Buder, Tustin, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/899,600

(22) Filed: Jul. 5, 2001

(65) Prior Publication Data

US 2003/0006341 A1 Jan. 9, 2003

(51) Int. Cl.[7] ............................................... B64G 1/00
(52) U.S. Cl. ...................... 244/54; 244/172; 248/557; 267/140.1; 267/141.1
(58) Field of Search ................................ 244/118.1, 54, 244/172; 248/554–557; 267/140.4, 141.1–141.5, 141, 140.5, 153, 293, 294, 151, 148; 188/378–380

(56) References Cited

U.S. PATENT DOCUMENTS

| | | | | |
|---|---|---|---|---|
| 28,619 A | * | 6/1860 | Vose | |
| 107,034 A | * | 9/1870 | Gardiner | |
| 1,822,026 A | * | 9/1931 | Guy | |
| 2,032,659 A | * | 3/1936 | Hussman | |
| 4,082,240 A | | 4/1978 | Heathman et al. | |
| 4,784,378 A | | 11/1988 | Ford | |
| 5,110,081 A | | 5/1992 | Lang, Jr. | |
| 5,150,657 A | * | 9/1992 | Bourgeot | 267/140.4 |
| 5,242,146 A | * | 9/1993 | Tecco et al. | 267/141.1 |
| 5,456,454 A | * | 10/1995 | Schulz | |
| 5,641,153 A | * | 6/1997 | Gwinn | |
| 5,743,509 A | * | 4/1998 | Kanda et al. | 267/141.2 |
| 5,842,677 A | | 12/1998 | Sweeney et al. | |
| 5,961,078 A | | 10/1999 | Edberg et al. | |
| 6,012,680 A | | 1/2000 | Edberg et al. | |
| 6,202,961 B1 | * | 3/2001 | Wilke et al. | 244/158 R |
| 6,237,795 B1 | * | 5/2001 | Buckley et al. | |
| 6,244,541 B1 | * | 6/2001 | Hubert | |
| 6,290,183 B1 | * | 9/2001 | Johnson et al. | 244/170 |

* cited by examiner

Primary Examiner—Galen L. Barefoot
(74) Attorney, Agent, or Firm—Alston & Bird LLP

(57) ABSTRACT

A vibration isolator is provided that includes a plurality of elastomeric members. The vibration isolator includes a first support, a second support and at least one third support. The second support is spaced from the first support such that the first and second supports define at least one recess. The at least one third support is spaced from the first support such that the third support and the first support define at least one recess. The recesses between the first and second supports and the first and third supports are structured to at least partially receive at least one of the elastomeric members. The vibration isolator includes at least one fastener that is structured to mount the corresponding elastomeric members between the first and third supports and between the first and second supports such that elastomeric members damp vibration transmitted between the first and second supports.

17 Claims, 9 Drawing Sheets

METHOD AND APPARATUS FOR DAMPING VIBRATION

FIELD OF THE INVENTION

The present invention relates to vibration in mechanical systems and, more particularly, relates to an apparatus and associated method for damping vibration.

BACKGROUND OF THE INVENTION

Satellites, spacecraft and other payloads are typically transported or launched into orbit using a launch vehicle, such as a rocket. Most payloads are attached to the launch vehicle only at the base of the payload such that the payload is cantilevered to the vehicle. During launch, and while the payload is being transported to its proper orbit and velocity, the payload is subjected to a severe vibration and acoustic environment that creates dynamic loads or vibroacoustic loads (referred to herein as "vibration") that are transmitted to the payload from the launch vehicle. The vibration can be the result of environmental effects such as wind gusts, as well as events such as motor ignitions and cut-offs, fuel depletion and stage jettisons. The vibration can have large amplitudes over a wide frequency range that can damage a payload and even cause post-orbit malfunctions. Due to the cost associated with the manufacture of most payloads, vibration is considered to be an important factor in the structural design of both payloads and launch vehicles.

Conventional approaches to improving launch survival of payloads have typically involved stiffening the structural components of the payload, as well as the fairing or mount securing the payload to the launch vehicle. However, structural stiffening usually requires the use of exotic and/or expensive materials and can necessitate an undesirable increase in the overall weight of the payload and the launch vehicle. In addition, the stiffened structural components still must undergo extensive and expensive testing to ensure that the payload will have a reasonable probability of launch survival. Other approaches have involved the use of flexible materials to isolate and reduce vibration in the axial direction between the vehicle and payload. However, such approaches typically rely on friction to support shear loads, which can negatively affect the flexibility and integrity of the flexible materials.

Thus, there remains a need to replace the conventional design approach of structural stiffening with a vibration isolator that can securely attach a payload to a vehicle while at the same time effectively damp the transmission of vibration between the vehicle and the payload. The vibration isolator should be capable of damping the transmission of vibration about three axes and of supporting shear loads without relying on friction. In addition, the isolator must be such that it can be manufactured and assembled with a minimum number of parts to reduce the overall weight of the payload and vehicle and so that the isolator can be easily assembled and disassembled, particularly in low-gravity environments.

SUMMARY OF THE INVENTION

The present invention provides a vibration isolator that can securely attach a payload to a vehicle, as well as effectively dampen the transmission of vibration between the vehicle and the payload about three axes. The vibration isolator includes a plurality of elastomeric members, which can be formed of silicone, natural and synthetic rubber, or any other elastomer having a relatively high density, modulus of resilience, and modulus of elasticity. The vibration isolator also includes a first support, a second support and at least one third support. The first, second and third supports cooperate with the plurality of elastomeric members to damp vibration between the first and second supports. At least one, and preferably both of the first and second supports have a circular configuration. The at least one third support can be configured in the shape of a plate or have a circular configuration. The first, second, and third supports can be formed of aluminum, AA 2000 series aluminum alloys, AA 7000 series aluminum alloys or titanium.

According to one embodiment, the second support is spaced from the first support such that the first and second supports define at least one recess therebetween. The at least one third support is spaced from the first support such that the first and third supports define at least one recess therebetween. The recesses between the first and second supports and the first and third supports are each structured to at least partially receive at least one of the elastomeric members. According to one embodiment, at least one and, preferably, all three of the first, second and third supports has at least one outer surface defining a plurality of angled surfaces about the perimeter thereof that at least partially define the recesses between the supports and retain the corresponding elastomeric members. Advantageously, the angled surfaces allow the vibration isolator to transmit vibration through the elastomeric members in three axes without excessively restraining the elastomeric members, which would reduce their flexibility. In addition, because the elastomeric members are allowed to bulge within the recesses and, more specifically, against the angled surfaces, the isolator can support shear loads without relying on friction. The vibration isolator includes at least one fastener being structured to mount the at least one elastomeric member between the first support and the at least one third support and mount the at least one elastomeric member between the first support and the second support such that elastomeric members damp vibration transmitted between the first and second supports.

In another embodiment of the present invention, the vibration isolator includes a first support having first and second flanges and a web portion extending therebetween. The vibration isolator includes a second support having first and second flanges and a web portion extending therebetween. The first flange of the second support is spaced from the second flange of the first support so as to define at least one recess therebetween. Each recess is structured to at least partially receive at least one of the elastomeric members. In one embodiment, the second flange of the first support and the first flange of the second support have outer surfaces defining a plurality of angled surfaces about the perimeter thereof adapted to retain a corresponding elastomeric member. The vibration isolator includes at least one third support spaced from the second flange of the first support. The at least one third support and the second flange of the first support define at least one recess therebetween. Each recess is structured to at least partially receive at least one of the elastomeric members. In one embodiment, the at least one third support and the second flange of the first support have outer surfaces defining a plurality of angled surfaces about the perimeter thereof adapted to retain a corresponding elastomeric member. The vibration isolator also includes at least one fastener that is structured to mount a corresponding elastomeric member between the second flange of the first support and the at least one third support and mount a corresponding elastomeric member between the second flange of the first support and the first flange of the second support such that the plurality of elastomeric members damp vibration transmitted between the first support and the second support.

In still another embodiment, the present invention provides a transport system including a payload and a vehicle for transporting the payload. The transport system includes a vibration isolator for damping vibration between the vehicle and the payload. The vibration isolator includes a first support having first and second flanges and a web portion extending therebetween. The first flange of the first support can be secured to the payload using suitable fasteners. The vibration isolator includes a second support having first and second flanges and a web portion extending therebetween. The second flange of the second support can be secured to the vehicle using suitable fasteners. In another embodiment, the first flange of the first support is secured to the vehicle and the second flange of the second support is secured to the payload. The first flange of the second support is spaced from the second flange of the first support so as to define at least one recess therebetween. Each recess is structured to at least partially receive at least one of the elastomeric members. The vibration isolator includes at least one third support spaced from the second flange of the first support. The at least one third support and the second flange of the first support define at least one recess therebetween. Each recess is structured to at least partially receive at least one of the elastomeric members. The vibration isolator includes at least one fastener that is structured to mount a corresponding elastomeric member between the second flange of the first support and the at least one third support and mount a corresponding elastomeric member between the second flange of the first support and the first flange of the second support such that the plurality of elastomeric members damp vibration transmitted between the first support and the second support.

The present invention also provides a method of damping vibration. The method includes providing a first support having at least one outer surface defining a plurality of angled surfaces about the perimeter thereof. A second support is provided having an outer surface spaced from an outer surface of the first support. The outer surface of the second support defines a plurality of angled surfaces about the perimeter thereof. At least one elastomeric member is positioned at least partially between the angled surfaces of the first and second supports. The at least one elastomeric member is preferably secured between the first and second supports. The at least one elastomeric member is displaced against the angled surfaces of the first and second supports to thereby dampen vibration between the first and second supports. In another embodiment, the method further includes providing at least one third support having an outer surface spaced from an outer surface of the first support, the outer surface of the at least one third support defining a plurality of angled surfaces about the perimeter thereof. At least one elastomeric member is positioned at least partially between the angled surfaces of the first and third supports. The at least one elastomeric member is preferably secured between the first and third supports. The at least one elastomeric member is displaced against the angled surfaces of the first and third supports to thereby dampen vibration between the first and second supports.

In another embodiment of the present invention, the method includes attaching a first support to a payload. A second support is attached to a vehicle. At least one elastomeric member is positioned between the first and second supports. At least one third support is positioned adjacent the first support. At least one elastomeric member is positioned between the first and third supports. The first, second and third supports are secured together to thereby mount the corresponding elastomeric members between the first and second supports and between the first and third supports. In one embodiment, the elastomeric members are secured between the corresponding supports by inserting at least one fastener through the first, second and third supports and the elastomeric members positioned therebetween. The elastomeric members positioned between the corresponding supports are displaced to thereby dampen vibration between the vehicle and payload.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
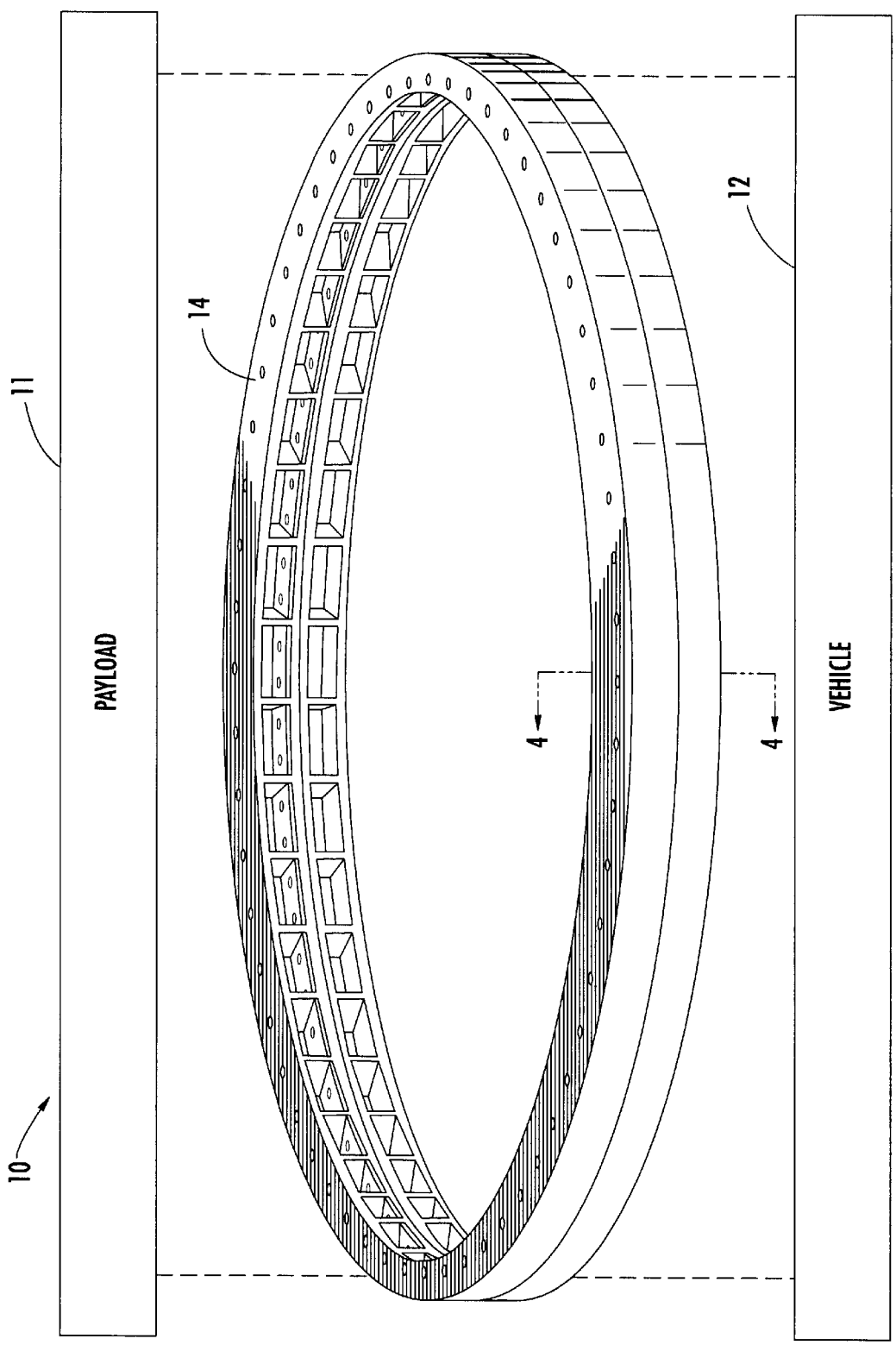
FIG. 1 is an exploded perspective view illustrating a transport system having a vehicle, a payload and a vibration isolator, according to one embodiment of the present invention.

Referring to FIG. 1, there is illustrated a terrestrial and extraterrestrial transport system 10, according to one embodiment of the present invention. The transport system 10 includes a payload 11 and a vehicle 12 for transporting the payload. The transport system 10 also includes a vibration isolator 14 for securing the payload 11 to the vehicle 12 and damping vibration between the vehicle and the payload. For extraterrestrial transport, the vehicle 12 can include, for purposes of example and not limitation, a rocket, a space shuttle, or any other vehicle for transporting a payload 11 into orbit. The payload 11 can include a satellite, a telescope, a space station or component thereof, as well as equipment and/or supplies. For terrestrial transport, the vehicle 12 can include a car, truck, trailer, airplane, boat or other motorized vehicle and the payload 11 will comprise the goods or products being transported.

Figure 2:
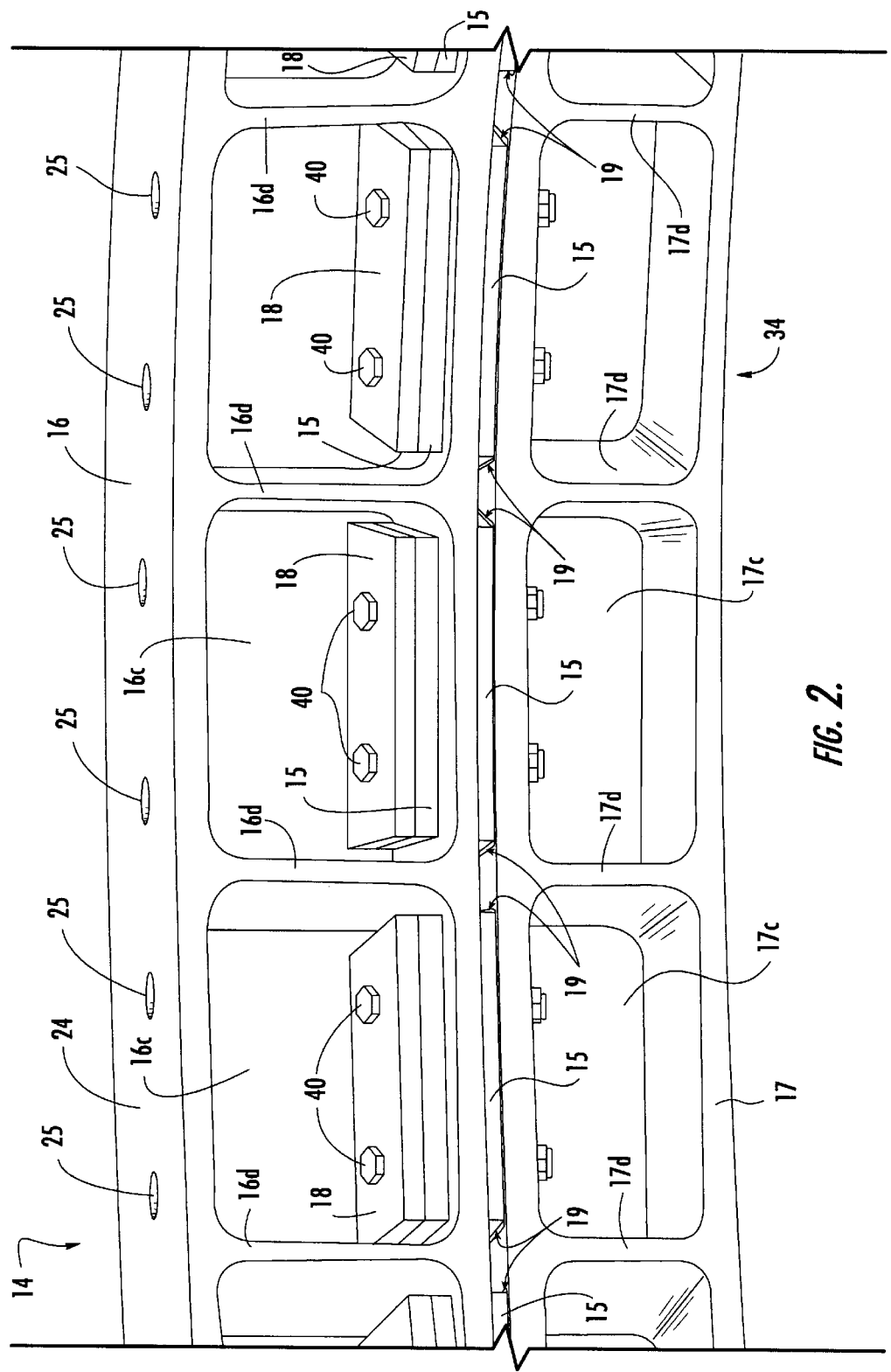
FIG. 2 is a partial perspective view illustrating the vibration isolator of FIG. 1.
Figure 3:
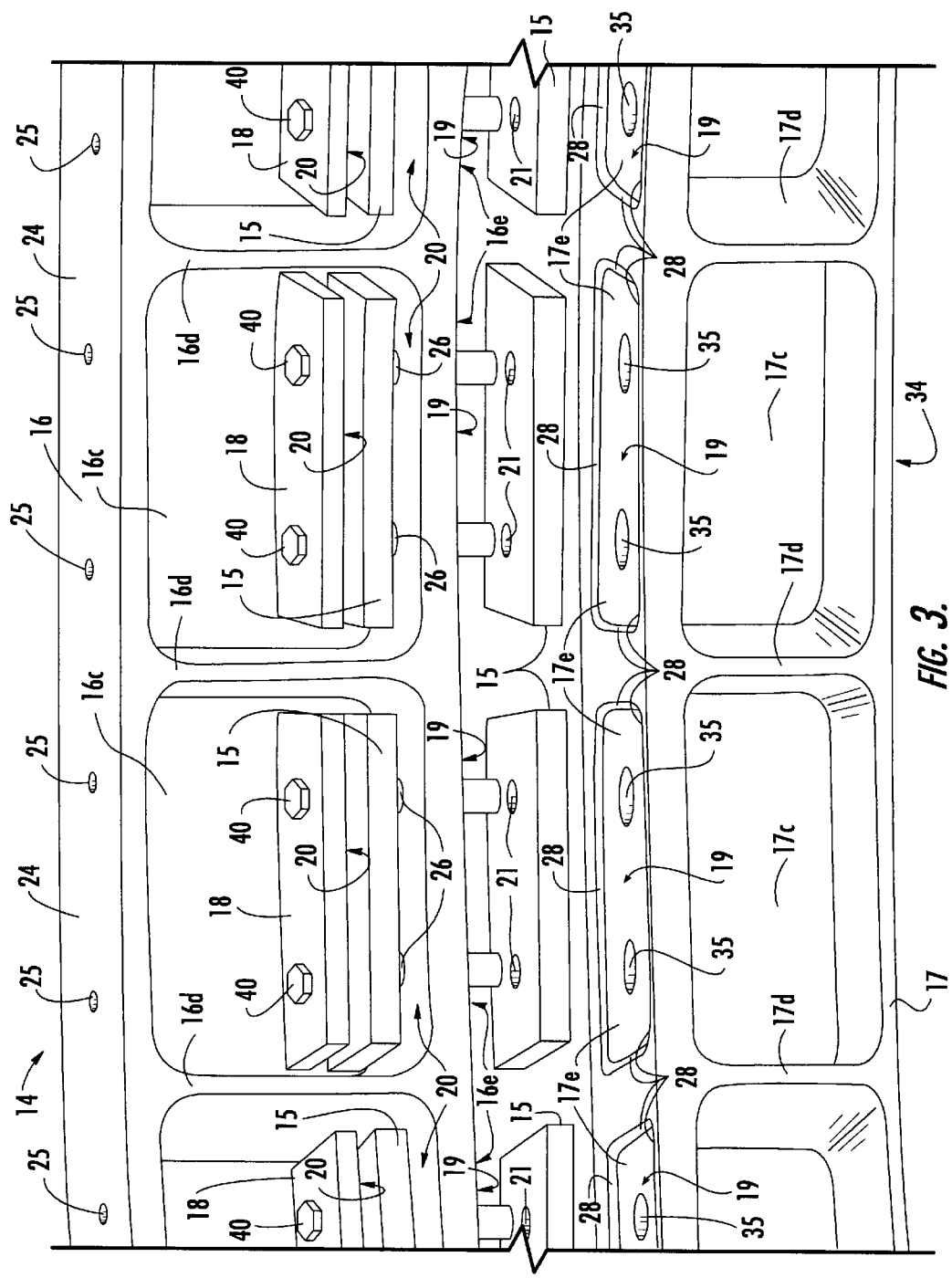
FIG. 3 is a partial exploded perspective view illustrating the vibration isolator of FIG. 1.
Figure 4:
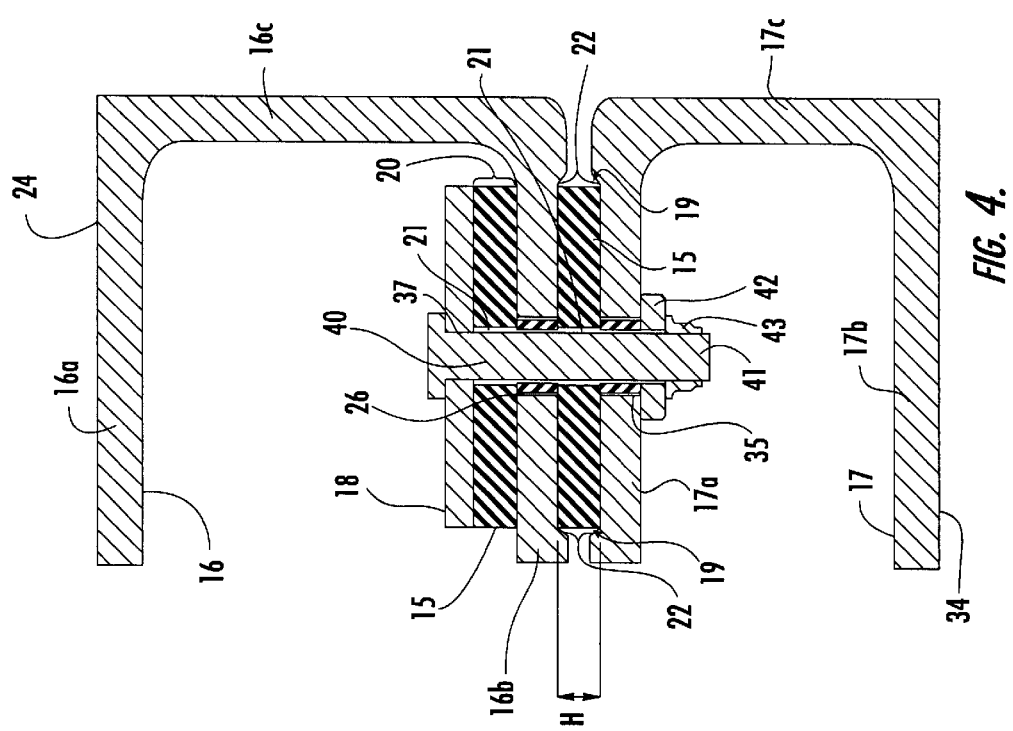
FIG. 4 is a cross-sectional view illustrating the vibration isolator of FIG. 1 along lines 4—4.
Figure 7:
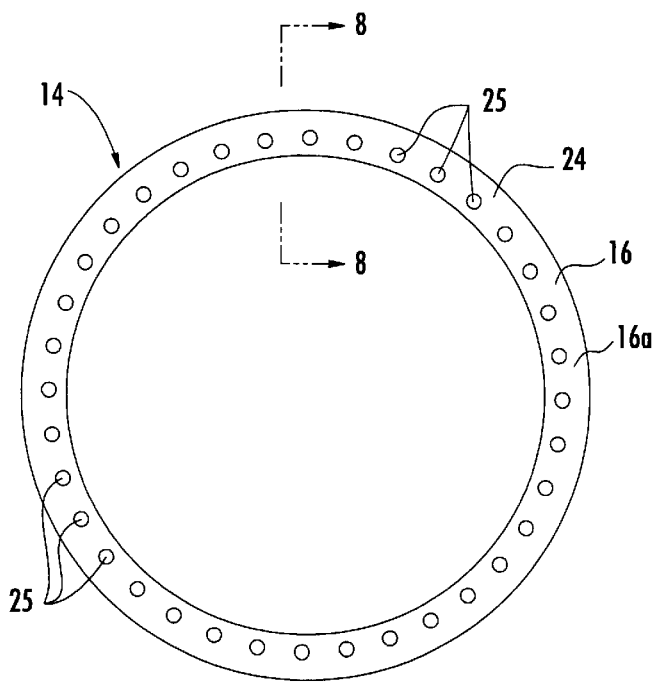
FIG. 7 is a plan view illustrating a vibration isolator, according to another embodiment of the present invention.

Referring to FIGS. 2, 3 and 4, the vibration isolator 14 includes a plurality of elastomeric members 15 for damping vibration, a first support 16, a second support 17, and at least one third support 18. The configuration and dimensions of the elastomeric members 15, first support 16, second support 17, and at least one third support 18, can vary depending on the application and, more particularly, on the weight and dimensions of the payload and the amplitude and frequency of vibration anticipated during transport. As illustrated in FIGS. 1 and 7, the first support 16 can have a circular or elliptical configuration such that the first support forms a ring. In other embodiments, the first support 16 can have a square or rectangular configuration. As illustrated in FIG. 4, the first support 16 preferably has a generally U-shaped cross-section defined by first and second flanges 16a, b and a web portion 16c extending therebetween. The first flange 16a of the first support 16 defines a relatively flat outer surface 24 that can be secured to a fairing, mount or other structure on the payload 11 using suitable fasteners (not shown), as is known in the art. For example, the outer surface 24 of the first flange 16a of the first support 16 can include a plurality of apertures 25 adapted to receive fasteners such as bolts that can be secured with washers and nuts. In other embodiments, the first flange 16a of the first support 16 can be secured permanently to the payload 11 by welding or can even be formed integrally with the frame of the payload. The first support 16 can be cast, forged or machined from stock material and, preferably, is formed of material having a high strength to weight ratio, such as aluminum, AA 2000 series aluminum alloys, AA 7000 series aluminum alloys or titanium. As illustrated in FIGS. 2 and 3, the first support 16 can include a plurality of ribs 16d to provide additional structural support.

As illustrated in FIG. 1, the second support 17 can have a circular or elliptical configuration such that the second support forms a ring. In other embodiments, the second support 17 can have a square or rectangular configuration. As illustrated in FIG. 4, the second support 17 preferably has a generally U-shaped cross-section defined by first and second flanges 17a, b and a web portion 17c extending therebetween. The second flange 17b of the second support 17 defines a relatively flat outer surface 34 that can be secured to a fairing, mount or other structure defined by the vehicle 12 using suitable fasteners (not shown), as is known in the art. For example, in one embodiment, the outer surface 34 of the second flange 17b of the second support 17 includes a plurality of apertures (not shown) adapted to receive fasteners such as bolts that can be secured with washers and nuts. In other embodiments, the second flange 17b of the second support 17 can be secured permanently to the vehicle 12 by welding or can even be formed integrally with the frame of the vehicle. The second support 17 can be cast, forged or machined from stock material and, preferably, is formed of material having a high strength to weight ratio, such as aluminum, AA 2000 series aluminum alloys, AA 7000 series aluminum alloys or titanium. As illustrated in FIGS. 2 and 3, the second support 17 can include a plurality of ribs 17d to provide additional structural support. Although the above discussion describes the first support 16 as corresponding to the payload 11 and the second support 17 as corresponding to the vehicle 12, the first and second supports are interchangeable and each may be secured to either the payload or the vehicle.

As illustrated in FIG. 4, the first flange 17a of the second support 17 is spaced from the second flange 16b of the first support 16 so as to define at least one recess or gap 19 therebetween that is structured to at least partially receive at least one of the elastomeric members 15. Preferably, the recesses 19 are spaced evenly along the length of the first and second supports 16, 17. For example, as illustrated in FIG. 1, the first and second supports 16, 17 each comprise a ring such that the first flange 17a of the second support 17 and the second flange 16b of the first support 16 define a plurality of recesses 19 along the length of each support, each recess 19 extending between the inside and outside circumference of the rings.

As illustrated in FIG. 3, the vibration isolator 14 includes a plurality of third supports 18 each configured in the shape of a square or rectangular plate. In another embodiment (not shown), the vibration isolator 14 can include a single third support 18 having a circular configuration such that the third support forms a ring. The third support 18 can be cast, forged or machined from stock material and, preferably, is formed of material having a high strength to weight ratio, such as aluminum, AA 2000 series aluminum alloys, AA 7000 series aluminum alloys or titanium. As illustrated in FIG. 4, the at least one third support 18 is spaced from the second flange 16b of the first support 16 on the side of the second flange 16b opposite the second support 17 so as to define at least one recess 20 therebetween. Each recess 20 between the third support 18 and the second flange 16b of the first support 16 is structured to at least partially receive at least one of the elastomeric members 15. In one embodiment, as illustrated in FIGS. 1, 2 and 3, the vibration isolator 14 includes a plurality of third supports 18 positioned along the length of the second flange 16b of the first support 16 thereby defining a plurality of recesses 20 each receiving a corresponding elastomeric member 15.

Figure 6:
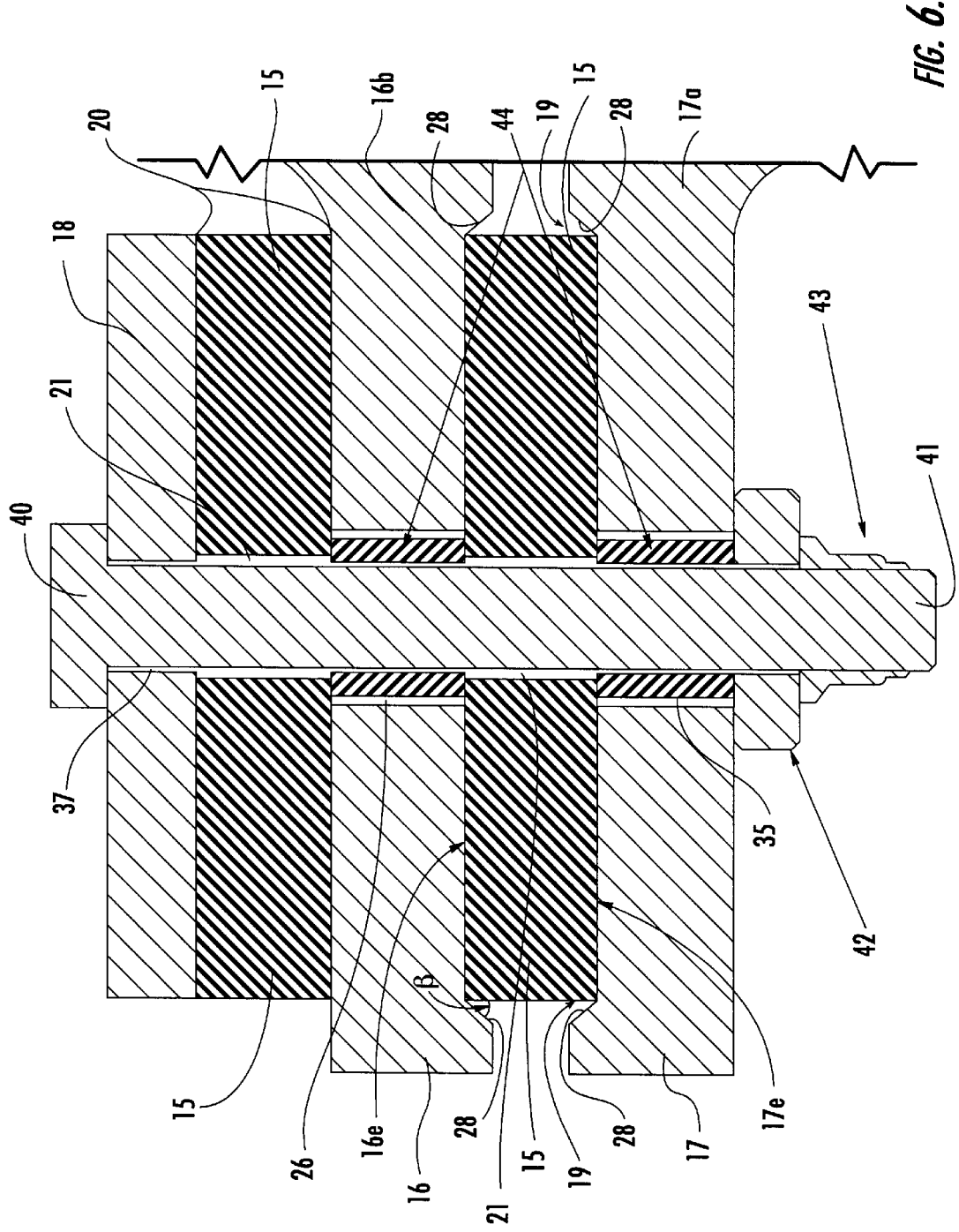
FIG. 6 is a cross-sectional view illustrating a fastener mounting the elastomeric members between the first, second and third supports of the vibration isolator of FIG. 4.

As illustrated in FIGS. 3 and 6, the vibration isolator 14 includes at least one and, preferably, a plurality of fasteners 40 that are each structured to mount a corresponding elastomeric member 15 between the second flange 16b of the first support 16 and the at least one third support 18 and mount a corresponding elastomeric member 15 between the second flange 16b of the first support 16 and the first flange 17a of the second support 17 such that the plurality of elastomeric members damp vibration transmitted between the first support and the second support. Each fastener 40 can include a bolt 41, a washer 42, and a lock nut 43. The bolt 41 of each fastener 40 preferably extends through an aperture 37 in a corresponding third support 18, through an aperture 21 in the elastomeric member 15 positioned between the third and first supports 18, 16, through an aperture 26 defined by the second flange 16b of the first support 16, through an aperture 21 defined by the elastomeric member 15 positioned between the first and second supports 16, 17, and, lastly, through an aperture 35 defined by the first flange 17a of the second support 17. Rubber bushings 44 can be positioned within the apertures 26 defined by the second flange 16b of the first support 16 and within the apertures 35 defined by the first flange 17a of the second support 17 to prevent frictional wear between the fastener 40 and the first and second supports. A washer 42 can be positioned over the end of the bolt 41 and moved adjacent the first flange 17a of the second support 17. A lock nut 43 can then be threaded onto the end of the bolt 41 to secure the bolt in position and thereby mount the plurality of elastomeric members 15 between the corresponding supports. The tightness of the nut 43 on the bolt 41 determines the amount of preload applied to the elastomeric members 15. The preload applied by the fastener 40 will depend on a variety of factors, including the weight and dimensions of the payload 11, the number of elastomeric members 15 being used, the amplitude and frequency of vibration anticipated, the elastic modulus of the elastomeric member, the compression set limit of the elastomeric members, and inertial load factors (i.e., the static portion of the accelerations, which is additive to the amplitude of the vibration). The higher the preload the stiffer the vibration isolator 14 and, conversely, the lower the preload the softer the vibration isolator. The number of fasteners 40 can vary depending on the application and, more particularly, on the length of the first, second and third supports, the number of elastomeric members 15, the weight and dimensions of the payload 11, and the amplitude and frequency of vibration anticipated during transport. In one embodiment, as illustrated in FIGS. 2 and 3, each third support 18 and elastomeric member 15 have two corresponding fasteners 40.

Figure 8:
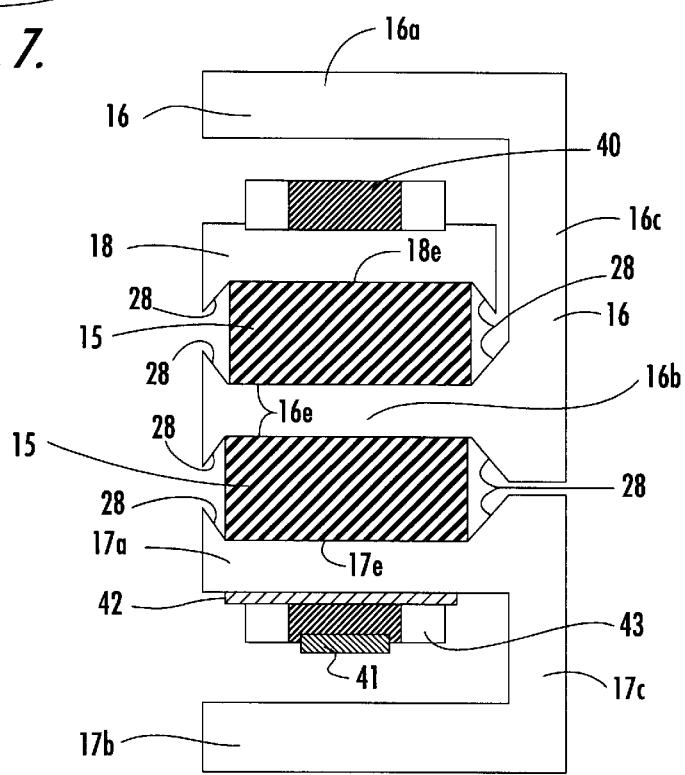
FIG. 8 is a cross-sectional view illustrating the vibration isolator of FIG. 7 along lines 8—8.
Figure 9:
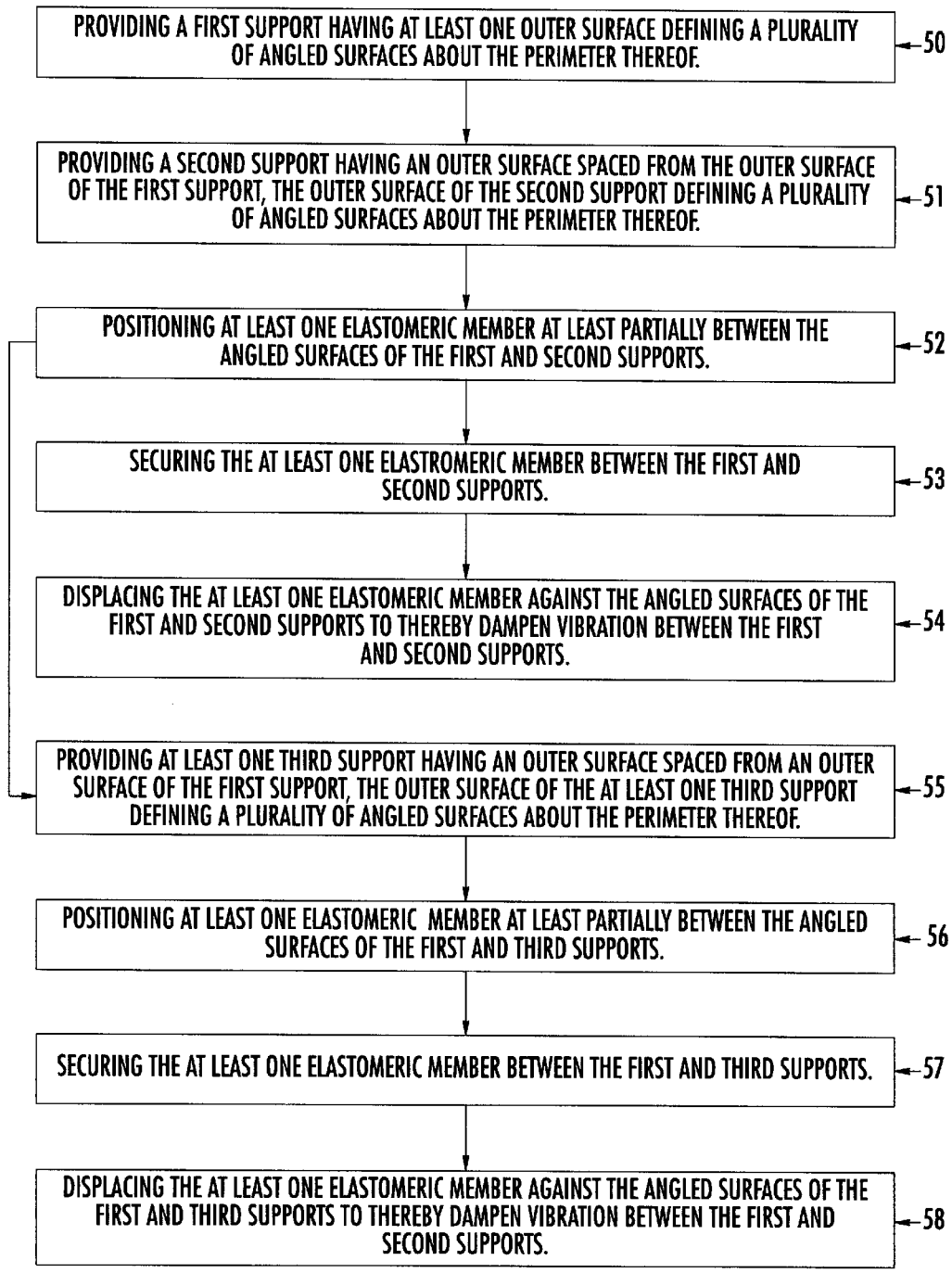
FIG. 9 is a flow chart illustrating a method of damping vibration, according to one embodiment of the present invention.
Figure 10:
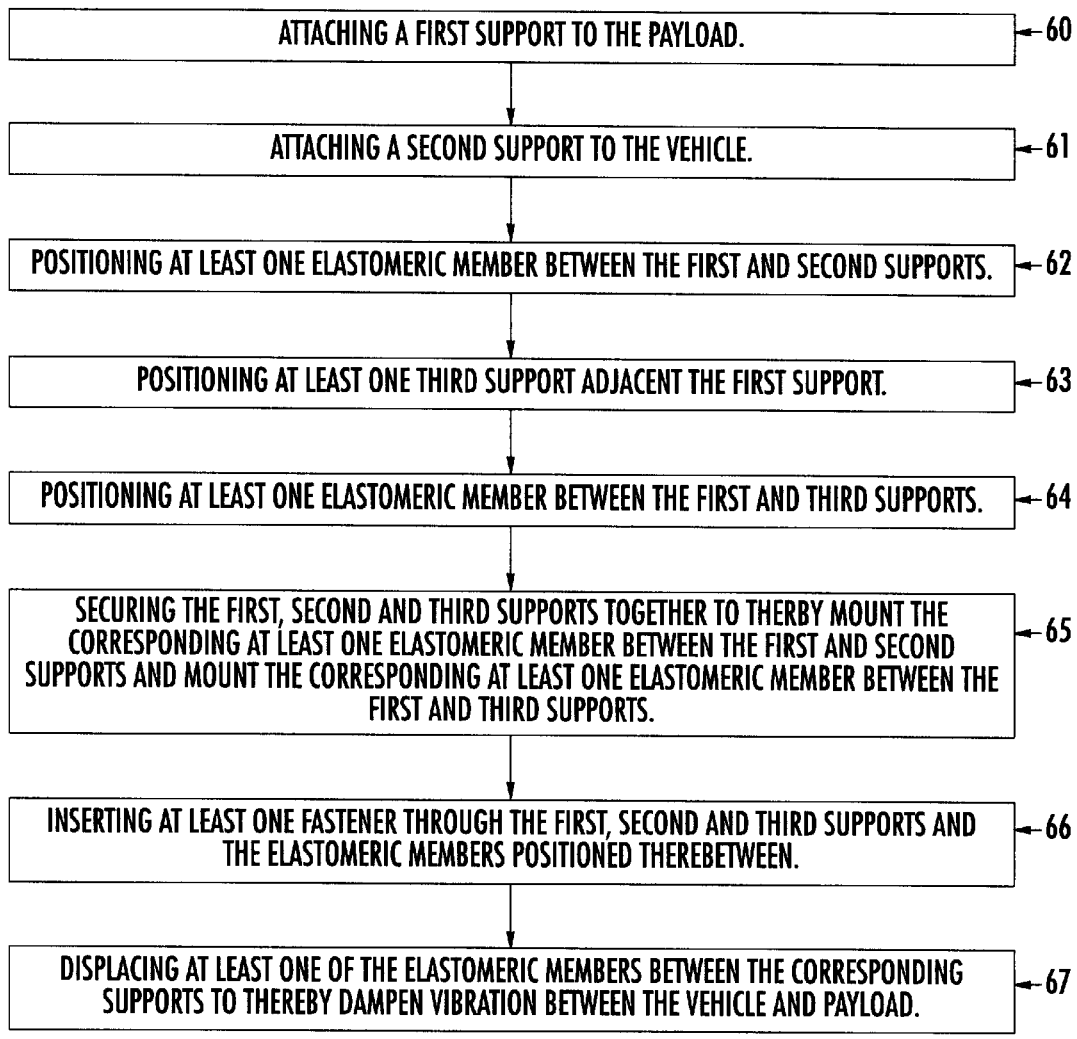
FIG. 10 is a flow chart illustrating a method of damping vibration, according to another embodiment of the present invention.

In one embodiment, as best illustrated in FIGS. 3, 4 and 6, the second flange 16b of the first support 16 and the first flange 17a of the second support 17 each has a facing outer surface 16e, 17e defining a plurality of angled surfaces 28 about the perimeter thereof that together at least partially define the recesses 19 between the supports. In another embodiment, as illustrated in FIG. 8, the first flange 17a of the second support 17 and the third support 18 each has an outer surface 17e, 18e defining a plurality of angled surfaces 28. According to this latter embodiment, the second flange 16b of the first support 16 has two outer surfaces 16e each defining a plurality of angled surfaces 28 and facing either the third support 18 or the first flange 17a of the second support 17. The plurality of angled surfaces 28 form shear tangs about the perimeter of each recess 19, 20 that are adapted to retain a corresponding elastomeric member 15 (in cooperation with the fasteners 40), while allowing the elastomeric member to bulge against the angled surfaces 28 of the shear tangs in response to vibration, tension, compression and shear loads. Advantageously, the displacing or bulging of the elastomeric members 15 dissipates the energy transmitted along the load paths through vibration, tension, compression and shear loads with minimal friction between the elastomeric members and the supports 16, 17, 18. The angle β of the angled surfaces 28 can vary depending on the dimensions of elastomeric members 15, the weight and dimensions of the payload 11, and the amplitude and frequency of vibration anticipated during transport. The smaller the angle β the stiffer the vibration isolator 14 and, conversely, the larger the angle β the softer the vibration isolator.

Figure 5:
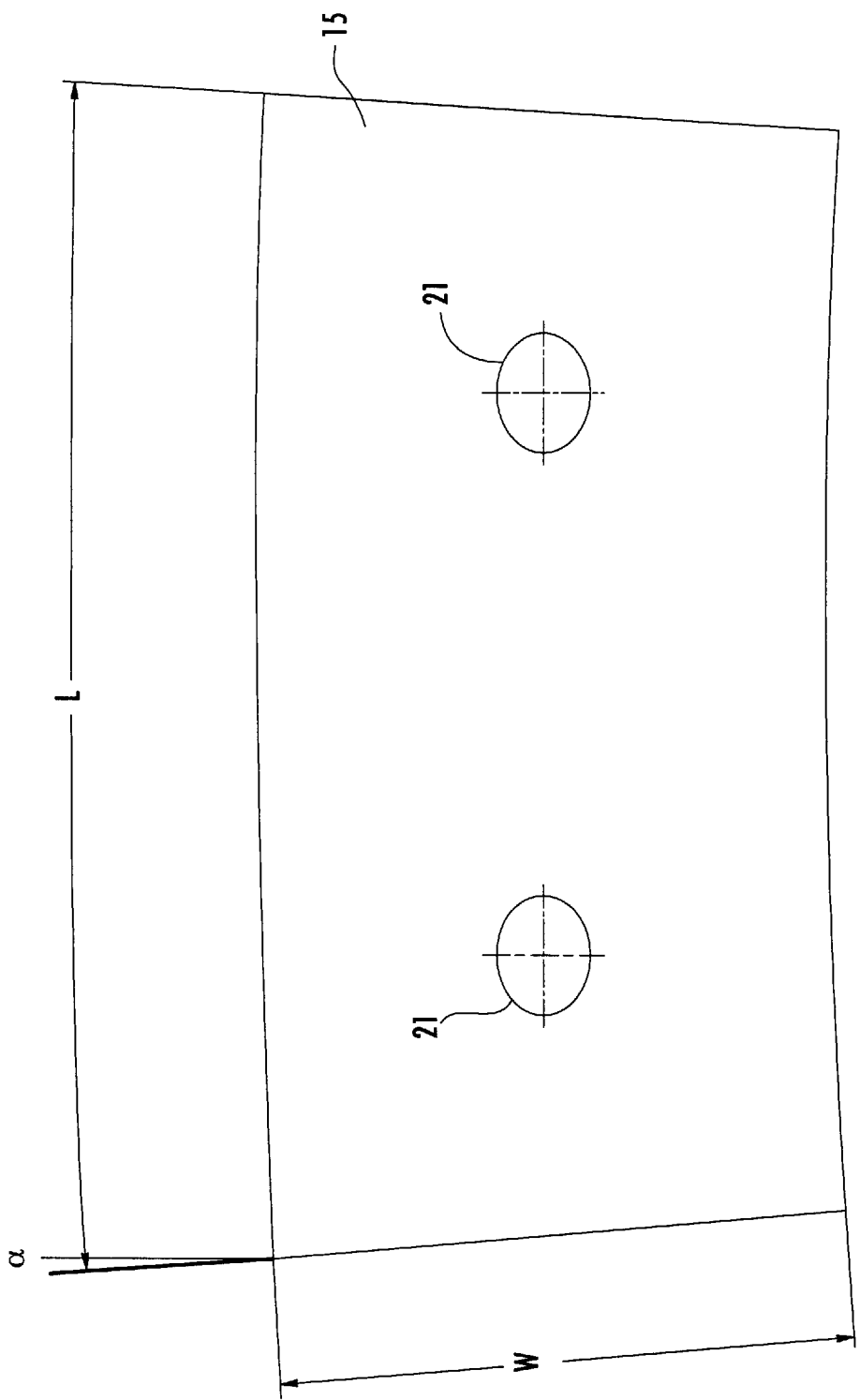
FIG. 5 is a plan view illustrating an elastomeric member, according to one embodiment of the present invention.

The elastomeric members 15 can be formed of silicone, natural and synthetic rubber, or any other elastomer having a relatively high density, modulus of resilience and modulus of elasticity. In one embodiment, the elastomeric members 15 are formed of a silicone rubber made by Kirkhill Rubber Company as product no. 980L5663. In another embodiment, the elastomeric members 15 are formed of VITON® elastomer, which is a synthetic rubber made by Dupont Dow Elastomers, L.L.C, or HI-DAMP® elastomer, which is a synthetic rubber made by Barry Wright Corporation, provided that the isolator 14 is placed in an insulated area of the vehicle 12 so that the ambient temperature does not become so low that the elastomeric members become brittle (this is primarily an issue in extraterrestrial transports). As illustrated in FIG. 5, the elastomeric members 15 can be configured in the shape of blocks. The width, height, and length of each elastomeric member 15 can vary depending on the application and, more particularly, on the weight and dimensions of the payload 11, the number of elastomeric members being used, the amplitude and frequency of vibration anticipated, the elastic modulus of the elastomeric member, the compression set limits of the elastomeric member, and inertial load factors (i.e., the static portion of the accelerations, which is additive to the amplitude of the vibration). In one embodiment, the elastomeric members 15 have a width W of approximately 2 inches, a length L of approximately 3.5 inches, and a height H of approximately 0.37 inches. As discussed above, each elastomeric member 15 preferably defines at least one aperture 21 therethrough that is adapted to receive a fastener 40. While the diameter of each aperture 21 may vary, according to one embodiment, each elastomeric member 15 defines two apertures 21 each having a diameter of approximately 0.375 inches. As discussed above, the first support 16, the second support 17, and/or the third support 18 may have circular configurations in which case the sides of the elastomeric members 15 are preferably angled. According to one embodiment, where the first and second supports 16, 17 have a diameter of approximately 62 inches, each lateral side of the elastomeric member 15 has an angle a equal to approximately 6.4 degrees.

The present invention also provides a method of damping vibration. The method includes providing a first support having at least one outer surface defining a plurality of angled surfaces about the perimeter thereof. See block 50. A second support is provided having an outer surface spaced from an outer surface of the first support. The outer surface of the second support defines a plurality of angled surfaces about the perimeter thereof. See block 51. At least one elastomeric member is positioned at least partially between the angled surfaces of the first and second supports. See block 52. The at least one elastomeric member is preferably secured between the first and second supports. See block 53. For example, the elastomeric member can be secured between the first and second supports using a suitable fastener or fasteners. The at least one elastomeric member is displaced against the angled surfaces of the first and second supports to thereby dampen vibration between the first and second supports. See block 54. Advantageously, the displacing of the elastomeric member 15 dissipates the energy transmitted along the load paths of the supports through vibration, tension, compression and shear loads with minimal friction between the elastomeric member and the supports. In another embodiment, the method further includes providing at least one third support having an outer surface spaced from an outer surface of the first support, the outer surface of the at least one third support defining a plurality of angled surfaces about the perimeter thereof. See block 55. At least one elastomeric member is positioned at least partially between the angled surfaces of the first and third supports. See block 56. The at least one elastomeric member is preferably secured between the first and third supports. See block 57. The at least one elastomeric member is displaced against the angled surfaces of the first and third supports to thereby dampen vibration between the first and third supports. See block 58.

In another embodiment of the present invention, the method includes attaching a first support to a payload. See block 60. The first support can be attached to a payload using suitable fasteners or by welding. A second support is attached to a vehicle. See block 61. The second support can be attached to a vehicle using suitable fasteners or by welding. At least one elastomeric member is positioned between the first and second supports. See block 62. At least one third support is positioned adjacent the first support. See block 63. At least one elastomeric member is positioned between the first and third supports. See block 64. The first, second and third supports are secured together to thereby mount the corresponding at least one elastomeric member between the first and second supports and mount the corresponding at least one elastomeric member between the first and third supports. See block 65. In one embodiment, the elastomeric members are secured between the corresponding supports by inserting at least one fastener through the first, second and third supports and the elastomeric members positioned therebetween. See block 66.

The elastomeric members between the corresponding supports are displaced to thereby dampen vibration between the vehicle and payload. See block 67. Many modifications and other embodiments of the invention will come to mind to one skilled in the art to which this invention pertains having the benefit of the teachings presented in the foregoing descriptions and the associated drawings.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A vibration isolator for damping vibration, comprising:
    a plurality of elastomeric members;
    a first support having first and second flanges and a web portion extending therebetween;
    a second support having first and second flanges and a web portion extending therebetween, said first flange of said second support being spaced from said second flange of said first support so as to define at least one recess therebetween, said at least one recess being structured to at least partially receive at least one of said plurality of elastomeric members;
    at least one third support spaced from said second flange of said first support, said at least one third support and said second flange of said first support defining at least one recess therebetween being structured to at least partially receive at least one of said plurality of elastomeric members; and
    at least one fastener being structured to mount said at least one of said plurality of elastomeric members between said second flange of said first support and said at least one third support and mount said at least one of said plurality of elastomeric members between said second flange of said first support and said first flange of said second support such that said plurality of elastomeric members support said first and second members symmetrically about three axes and damp vibration transmitted between said first support and said second support.

2. A vibration isolator according to claim 1 wherein at least one of said first, second, and third supports has a circular configuration.

3. A vibration isolator according to claim 1 wherein said at least one third support is configured in the shape of a plate.

4. A vibration isolator according to claim 1 wherein said first, second, and third supports are formed of materials selected from the group consisting of aluminum, AA 2000 series aluminum alloys, AA 7000 series aluminum alloys, and titanium.

5. A vibration isolator according to claim 1 wherein said plurality of elastomeric members are formed of materials selected from the group consisting of silicone, natural rubber, and synthetic rubber.

6. A vibration isolator according to claim 1 wherein said second flange of said first support has a pair of outer surfaces, at least one of said outer surfaces defining a plurality of angled surfaces about the perimeter thereof.

7. A vibration isolator according to claim 1 wherein said first flange of said second support has an outer surface defining a plurality of angled surfaces about the perimeter thereof.

8. A vibration isolator according to claim 1 wherein said at least one third support has an outer surface defining a plurality of angled surfaces about the perimeter thereof.

9. A transport system, comprising:
    a payload;
    a vehicle for transporting said payload;
    a vibration isolator for securing said payload to said vehicle and damping vibration between said vehicle and said payload, comprising:
        a plurality of elastomeric materials;
        a first support having first and second flanges kind a web portion extending therebetween, said first flange of said first support being secured to said payload;
        a second support having first and second flanges and a web portion extending therebetween, said first flange of said second support being spaced from said second flange of said first support so as to define at least one recess therebetween, said at least one recess being structured to at least partially receive at least one of said plurality of elastomeric members, said second flange or said second support being secured to said vehicle;
        at least one third support spaced from said second flange of said first support, said at least one third support and said second flange or said first support defining at least one recess therebetween being structured to at least partially receive at least one of said plurality of elastomeric members; and
        at least one fastener being structured to mount said at least one of said plurality of elastorrieric members between said second flange of said first support and said at least one third support and mount said at least one of said plurality of elastomeric members between said second flange of said first support and said first flange of said second support such that said plurality of elastomeric members support said first and second members symmetrically about three axes and dump vibration transmitted between said vehicle and said payload.

10. A transport system according to claim 9 wherein at least one of said first, second, and third supports has a circular configuration.

11. A vibration isolator according to claim 9 wherein said at least one third support is configured in the shape of a plate.

12. A transport system according to claim 9 wherein said first, second, and third supports are formed of materials selected from the group consisting of aluminum, AA 2000 series aluminum alloys, AA 7000 series aluminum alloys, and titanium.

13. A transport system according to claim 9 wherein said plurality of elastomeric members are formed of materials selected from the group consisting of silicone, natural rubber, and synthetic rubber.

14. A transport system according to claim 9 wherein said second flange of said first support has a pair of outer surfaces, at least one of said outer surfaces defining a plurality of angled surfaces about the perimeter thereof.

15. A transport system according to claim 9 wherein said first flange of said second support has an outer surface defining a plurality of angled surfaces about the perimeter thereof.

16. A transport system according to claim 9 wherein said at least one third support has an outer surface defining a plurality of angled surfaces about the perimeter thereof.

17. A method of damping vibration between a vehicle and a payload, comprising:

attaching a first support to the payload, the first support having first and second flanges and a web portion extending therebetween;

attaching a second support to the vehicle, the second support having first and second flanges and a web portion extending therebetween, the first flange of the second support being spaced from the second flange of the first support so as to define at least one recess therebetween;

positioning at least one third support spaced from the second flange of the first support the at least one third support and the second flange of the first support defining at least one recess therebetween;

positioning at least one elastomeric member between the first and second supports within the corresponding at least one recess;

positioning at least one elastomeric member between the first and third supports within the corresponding at least one recess;

securing the first, second and third supports together to thereby mount the corresponding at least one elastomeric member between the second flange of the first support and he first flange of the second support and mount the corresponding at least one elastomeric member between the second flange of the first support and the at least one third support such that said elastomeric members support said first and second members symmetrically about three axes; and displacing at least one of the elastomeric members between the corresponding sup ports to thereby dampen vibration between the vehicle and payload.

\* \* \* \* \*

UNITED STATES PATENT AND TRADEMARK OFFICE
CERTIFICATE OF CORRECTION

PATENT NO. : 6,609,681 B2
DATED : August 26, 2003
INVENTOR(S) : Buder

It is certified that error appears in the above-identified patent and that said Letters Patent is hereby corrected as shown below:

Column 10,
Line 28, "kind" should read -- and --;
Lines 37 and 41, "or" should read -- of --;
Line 46, "elastorrieric" should read -- elastomeric --;
Line 54, "dump" should read -- damp --.

Column 12,
Line 2, after "support" insert a comma -- , --;
Line 14, "he" should read -- the --;
Line 21, "sup ports" should read -- supports --;
Line 22, insert claim 18:
     -- 18. A method according to Claim 17 wherein said securing step comprises inserting at least one fastener through the first, second and third supports and the elastomeric members positioned therebetween. --.

Signed and Sealed this

Twenty-fourth Day of February, 2004

JON W. DUDAS
*Acting Director of the United States Patent and Trademark Office*